J. L. ANDERSON.
METHOD OF WELDING.
APPLICATION FILED DEC. 5, 1919. RENEWED NOV. 26, 1921.
1,402,996.                                    Patented Jan. 10, 1922.
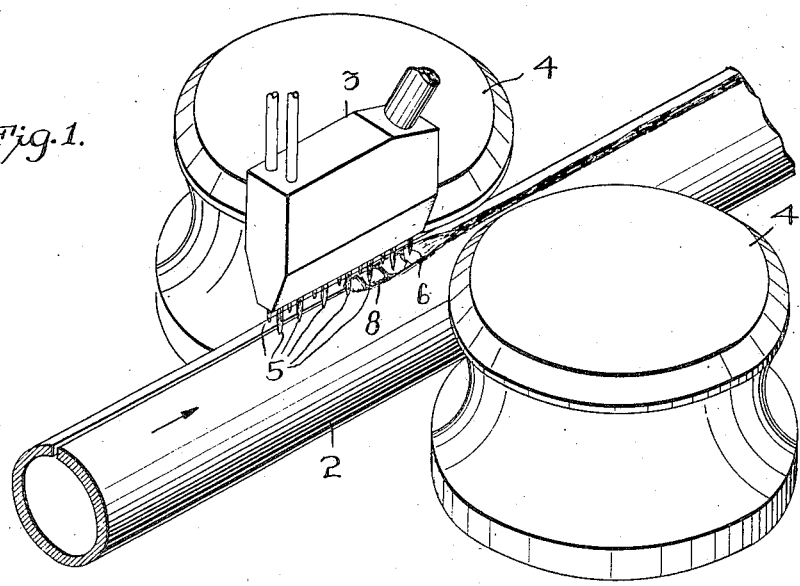
Fig. 1.
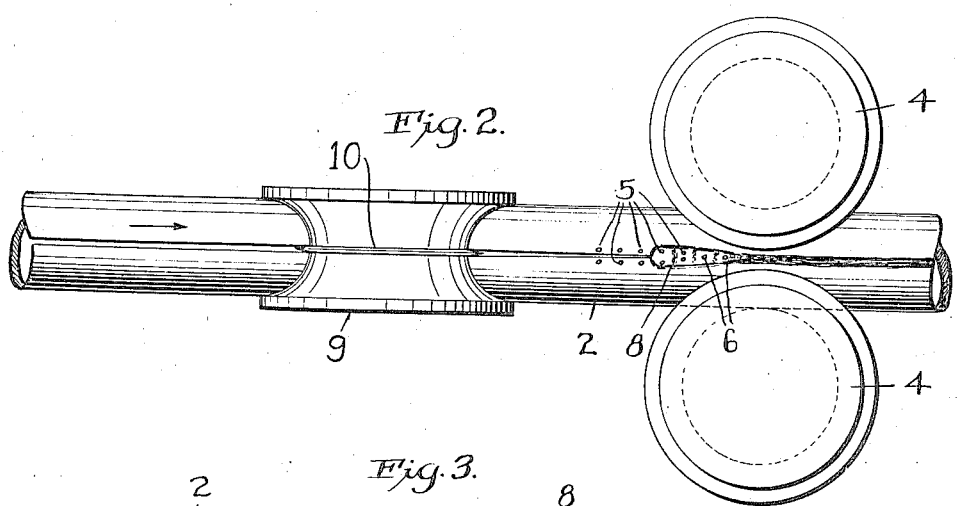
Fig. 2.
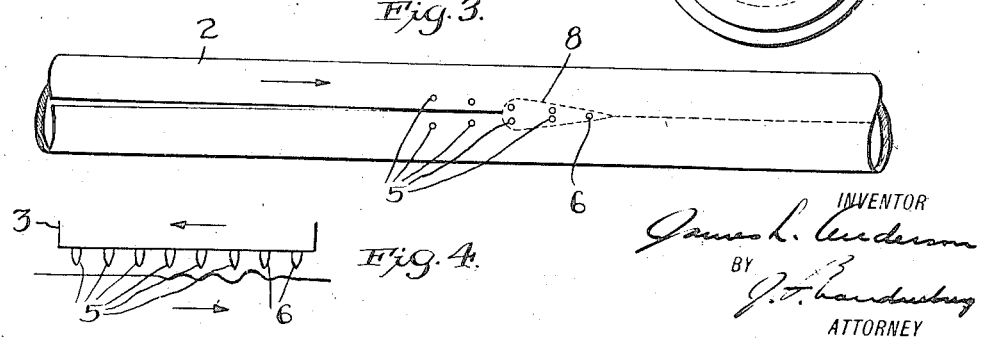
Fig. 3.
Fig. 4.
INVENTOR
James L. Anderson
BY
ATTORNEY

UNITED STATES PATENT OFFICE.

JAMES L. ANDERSON, OF BAYONNE, NEW JERSEY, ASSIGNOR TO DAVIS-BOURNON-VILLE COMPANY, OF NEW YORK, N. Y., A CORPORATION OF NEW YORK.

METHOD OF WELDING.

1,402,996.          Specification of Letters Patent.      Patented Jan. 10, 1922.

Application filed December 5, 1919, Serial No. 342,768. Renewed November 26, 1921. Serial No. 518,071.

*To all whom it may concern:*

Be it known that I, JAMES L. ANDERSON, a citizen of the United States, and resident of Bayonne, in the county of Hudson and State of New Jersey, have invented a new and useful Improvement in Methods of Welding, of which the following is a specification.

In my copending application, Serial No. 317,281, filed August 13, 1919, I have described a method of progressively butt-welding longitudinal seams, particularly of tubing, by the oxyacetylene or like autogenous welding flame, which method is characterized by the employment of jets disposed for a distance lengthwise of the seam and spaced at opposite sides of the center, so that the heat is applied back of the seam edges rather than in the crevice, while the interior of the tube may be filled with a diffused flame and unburned gas from the central part of the envelope, of a reducing and annealing character. This mode of welding results in important advantages, in respect to the strength of the weld, avoidance of waste, ease of control, and speed of production, which are set forth in the said application. The typical flame grouping for this process comprises spaced longitudinal rows of jets, but other specific arrangements may be used, some of which are disclosed in another application, Serial No. 317,282, filed August 13, 1919, relating to forms of torch suitable for carrying out the process. I now find that when the preheating and welding are performed with a double or spread flame, followed by one or more central jets, a further advantage is secured, in that the central jet or jets lay the piled-up metal of the welded section, thus producing a smoother weld, more favorable for mechanical finishing operations, and avoiding any possibility of the rearward spaced welding jets leaving gouge marks.

In the accompanying drawings illustrating the improvement:

Fig. 1 is a perspective view showing tubing being welded in the manner described;

Fig. 2 is a plan, showing the use of parallel rows and two central jets in tandem;

Fig. 3 is a diagrammatic plan showing another flame arrangement; and

Fig. 4 is a diagrammatic view illustrating the action of the jets.

Continuous relative longitudinal movement is produced between the tube 2 and the torch 3, this being obtained in practice by driving the tube with its seam uppermost beneath the torch, the latter being suitably supported in a stationary manner, with provision for appropriate adjustment. The tube is typically held and driven by rollers, including a pair 4 on vertical axes in rear of the region of fusion. These rollers are regularly provided with transverse adjusting screws, and may be used to work the fused edges to greater or less extent by compression. The upper of a pair of guide rollers on horizontal axes is represented at 9 in Fig. 2, this roller being equipped with a guide fin 10 operating in the open seam.

In the case of barrel or other larger tubular bodies, or for flat or prismatic work, the work is stationary and the torch is driven.

The oxyacetylene flame here employed comprises jets 5 in parallel or converging lines or equivalent relation, straddling the seam, with one or more jets 6 in rear of the welding jets located centrally or close to the center line. By the jets 5 the portions of the tube wall at opposite sides of the seam are successively preheated and melted and caused to unite. Toward the rear third, more or less, of the collection, where the welding takes place, a broad wave 8 of the molten material is formed, and tends to flow around behind and pile up in an elevated ridge, the sides of which may be sharply demarked by the plowing action of the last double jets. This accumulation, however, while still molten, is acted upon by the central jet or jets 6, which cause the metal to flow laterally. According to the number and size of these jets the weld can be left full and somewhat raised or substantially flat, as desired. Where the tubing is subsequently to be drawn or swaged, a raised weld is disadvantageous, tending to cause crimping, and under such circumstances the invention makes it possible to obtain a substantially smooth surface. In other cases extra thickness is desired, which can be secured while avoiding sharp ridging.

Fig. 4 illustrates the action of the jets. The line beneath the jets represents the top of the seam and weld. The lower arrow represents the direction of movement if the work is driven, and the upper arrow the direction if it is the torch which is moved.

The first three jets are preheating the metal at opposite sides of the seam. Beneath the fourth pair the edges commence to fuse, and the melting is carried deeper beneath the fifth and sixth pairs, piling up behind the jets in the manner indicated. At this point the seam may be understood to have been fused to its full depth, and there is a substantial accumulation of metal, which the central jets 6 proceed to disperse.

The flame elements may be arranged in numerous specifically different ways, some of which are indicated in an application filed of even date herewith covering embodiments of a torch suitable for carrying out the process. Fig. 1 shows the use of two rows and a single central jet at the rear; Fig. 2 illustrates two parallel rows and two rear central jets in tandem; and Fig. 3 represents an instance of rows of jets 5 which converge to a single jet 6 at the back.

In some cases the leading or preheating jets can be supplied with cheaper gases than the oxyacetylene mixture, producing a lower temperature serviceable however for preheating.

What I claim as new is:

1. The herein described method of butt-welding seams which comprises progressively heating and fusing a substantial section by the application of a longitudinally extending, transversely spread group of jets, and acting upon the piled-up material in rear of the welding point by one or more flame jets applied at or close to the center line of the seam.

2. The method of welding tubing, which comprises the progressive heating and fusing together of the metal by the application of the intensely heated points of a plurality of welding jets at opposite sides of the seam at regions slightly removed from the edges, succeeded by a jet delivered substantially in the central line.

3. The method of welding tubing, which comprises progressively heating and fusing the margins of the seam by the application of the intensely heated points of a plurality of welding jets at opposite sides of the seam at regions somewhat removed from the edges, succeeded by a jet of similar character acting substantially in the central line.

4. Improvement in the method of progressively butt-welding seams by the application of the intensely heated points of rows or lines of autogenous welding jets at opposite sides of the seam removed from the edges, to fuse the edge regions and cause them to flow together, characterized by the application toward the rear of said jets of one or more finishing jets acting substantially in the central longitudinal line.

JAMES L. ANDERSON.